Nov. 3, 1931.  E. M. CROSLAND  1,830,425
MACHINE FOR APPLYING CONFECTORY MATERIAL TO BISCUITS
Filed Aug. 14, 1928  4 Sheets-Sheet 1

Fig.1.

INVENTOR
E. M. CROSLAND.
BY Sturtevant & Mason
ATTORNEYS

Nov. 3, 1931.  E. M. CROSLAND  1,830,425
MACHINE FOR APPLYING CONFECTORY MATERIAL TO BISCUITS
Filed Aug. 14, 1928  4 Sheets-Sheet 2
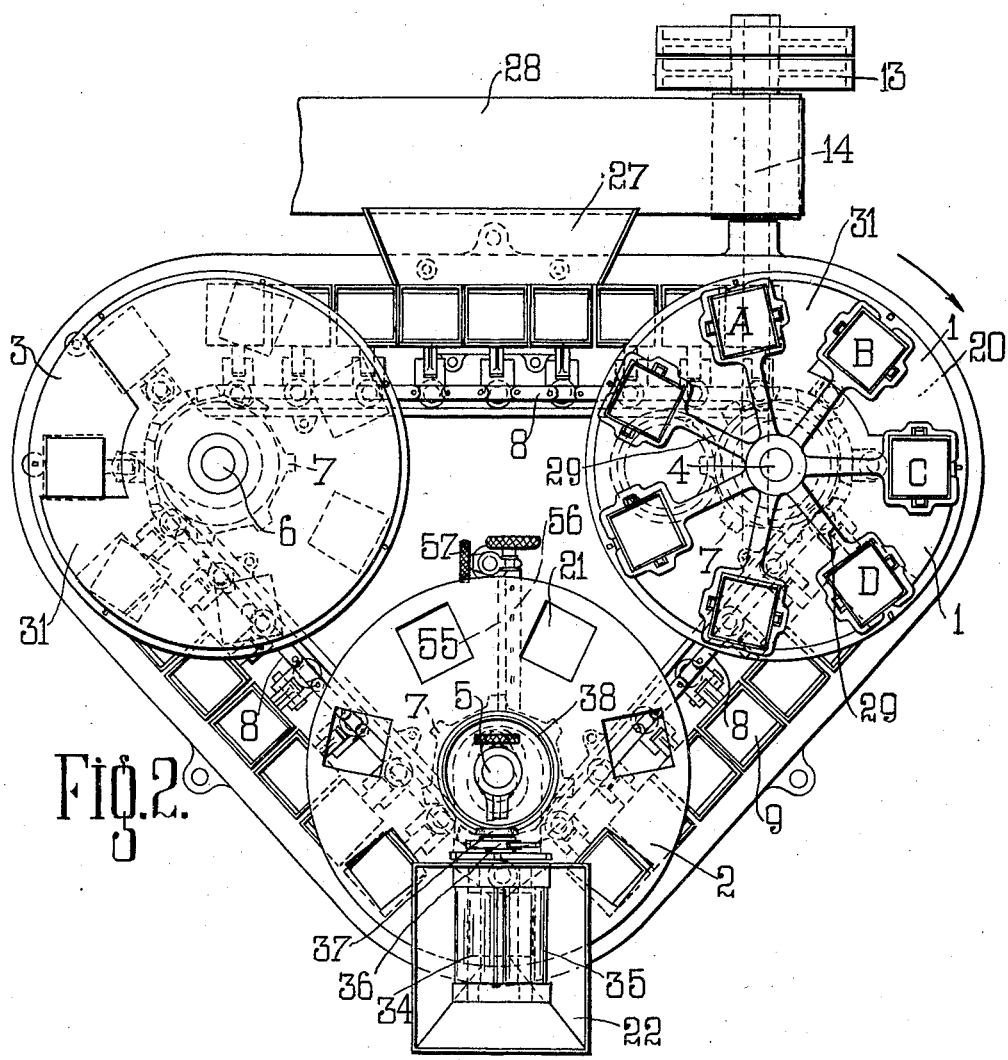

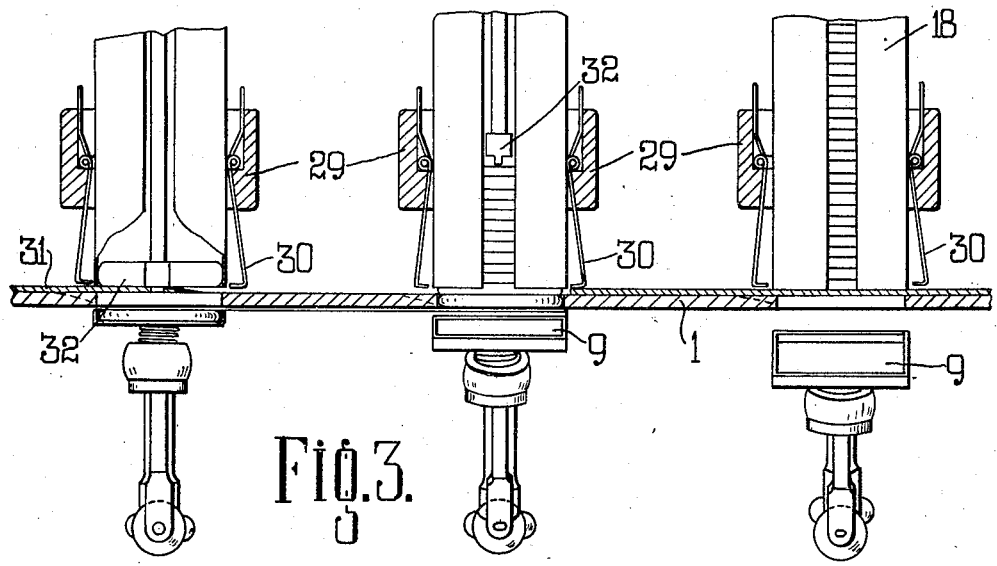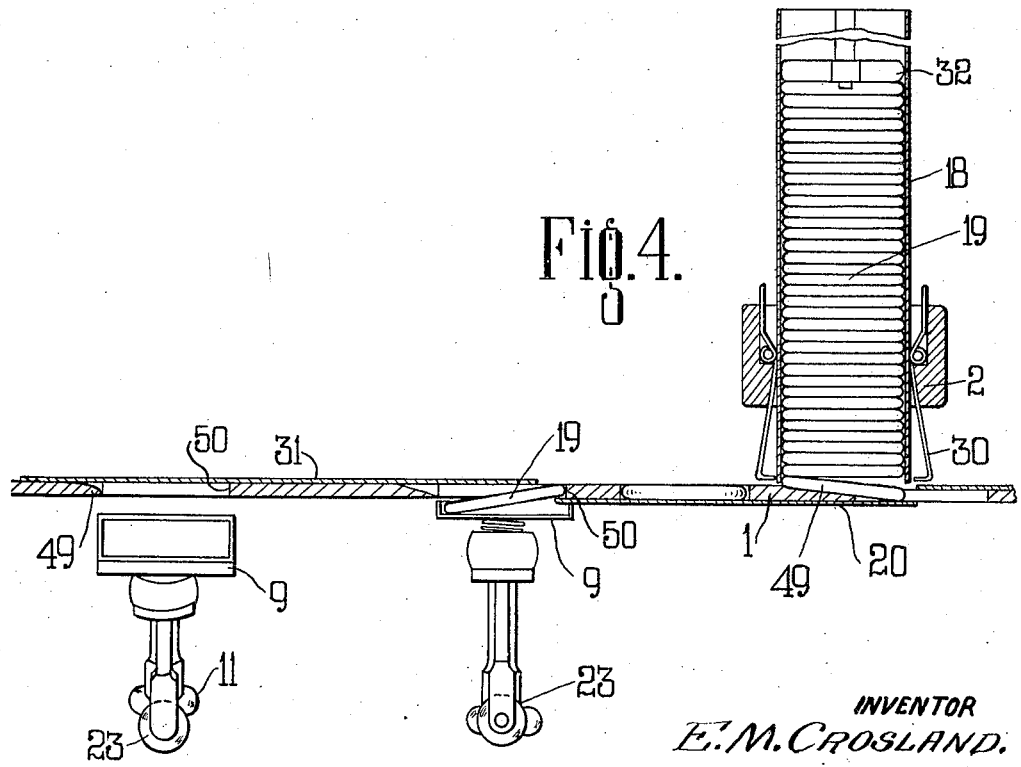

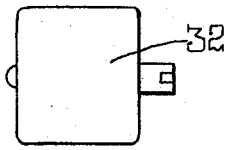
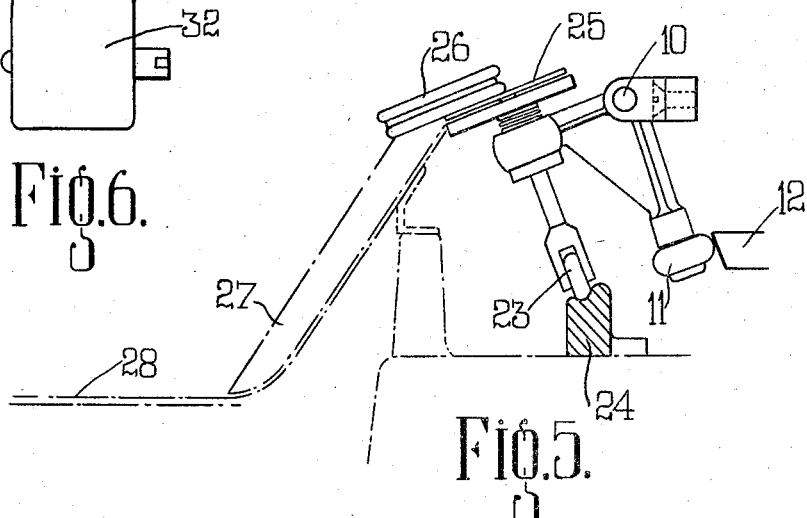
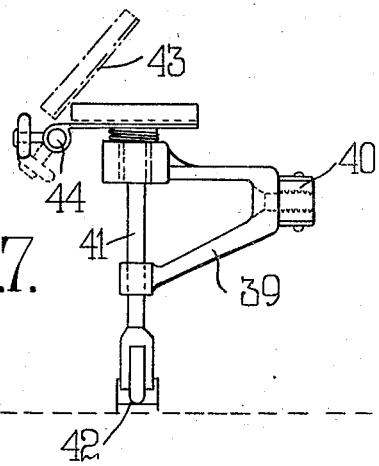
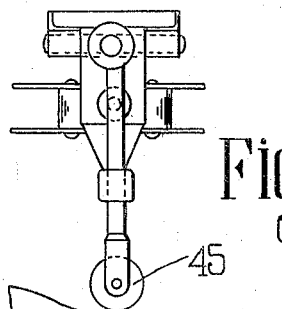
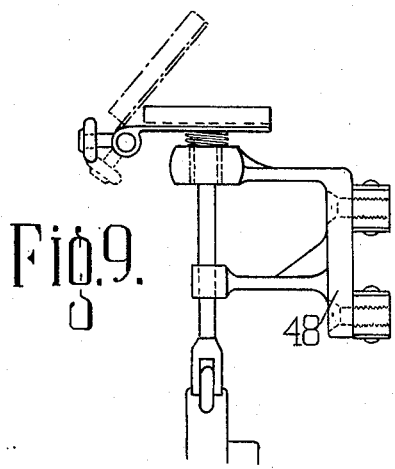
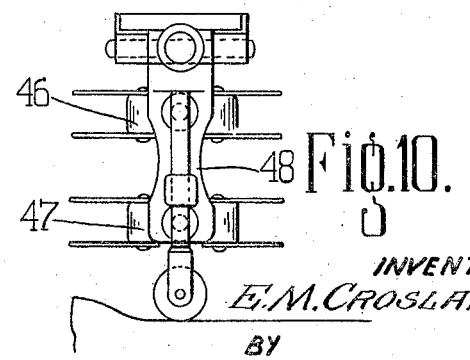

Patented Nov. 3, 1931

1,830,425

UNITED STATES PATENT OFFICE

EDWARD MILNER CROSLAND, OF NEWTON-LE-WILLOWS, ENGLAND, ASSIGNOR TO T. AND T. VICARS LIMITED, OF EARLESTOWN, NEWTON-LE-WILLOWS, ENGLAND, A BRITISH COMPANY

MACHINE FOR APPLYING CONFECTORY MATERIAL TO BISCUITS

Application filed August 14, 1928, Serial No. 299,477, and in Great Britain September 1, 1927.

The present invention relates to machines for automatically applying confectory material to biscuits.

In machines of this type it has been usual to provide means for feeding a biscuit into contact with and in suitable position relatively to a movable and flexible stencil band which is displaced relatively to a hopper for supplying confectory material which is pressed into contact with a stationary stencil plate against which a movable hopper is laterally displaced.

The object of the present invention is to provide a machine in which biscuits are brought one at a time opposite a stencil opening in a rigid stencil plate which has a displacement relatively to cleaning devices, such as scrapers.

A further object is to provide in a machine of the above type a rigid plate which is preferably in the form of a rotating disc provided with a number of stencil openings around its periphery and which can be fed forward to bring these stencils one at a time under a hopper supplied with the confectory material to be applied. By confectory material is meant a filling insertion or application of substances such as cream, icing or jam.

Means such as an endless chain may be provided to bring biscuits one at a time in contact with the stencil. This chain may for instance, be mounted on sprockets rotating about vertical axes and the biscuit carriers can be arranged movable relative to said chain and provided with means for bringing them up into contact with the stencil.

The endless chain may bring the biscuit carriers under a perforated plate moving under a hopper for receiving biscuits one at a time from this hopper, and allowing these to drop through the plate on to the carriers on the carrier chain. Biscuits may then be conveyed under the rotating stencil and then can be brought by means of the carrier chain under a third rotating plate co-axial with the sprocket spindle to receive a further biscuit where it is desired to manufacture sandwich biscuits.

Suitable cam paths can be provided for controlling the biscuit carriers and these carriers may be provided with stops for retaining the biscuit with a false bottom so that the biscuits can be readily ejected therefrom when the process has been completed.

It is preferred that the feeding disc for the biscuits are of a thickness substantially equal to the thickness of the biscuits, the side of one perforation being normal to the surfaces of the disc, whilst the other side is inclined thereto, so that the biscuit may fall gradually into an opening from the hopper.

The invention is more particularly described with reference to the accompanying drawings in which:—

Figure 1 is an elvational view, partly in section, of a preferred form of construction.

Figure 2 is a corresponding plan view.

Figure 3 is a part sectional elevation of the mechanism for obtaining automatic movement of the hoppers and magazines.

Figure 4 is a part sectional elevation of the mechanism controlling the passage of the biscuit from the hopper to carrier.

Figure 5 shows the method of discharging the biscuit from the carrier when treatment is finished.

Figure 6 is a plan view of part of the mechanism shown in Figure 3 for causing automatic movement of magazines.

Figures 7, 8, 9, 10 show alternative forms of construction of the biscuit carrying and ejecting mechanism.

Referring to the drawings, discs 1, 2 and 3, having perforations of suitable shape are rotatable about spindles 4, 5, and 6 respectively. Rotatable with these discs are sprocket wheels 7 in mesh with an endless chain 8 which carries biscuit carriers 9.

Pulleys 13, on a spindle 14 take the drive from a source of power and by means of gearing 15, 16, 17 cause the disc 1 through its sprocket wheel 7 to rotate. The chain 8 transmits the motion to discs 2 and 3.

Each carrier 9 is caused to oscillate, at given points in its path round the machine, about a fulcrum 10, so as to alter its vertical disposition relative to the discs. Each carrier 9 is provided with a roller 11 contacting with a cam path 12 for obtaining said oscillation whilst it is also provided with a second roller 23 in contact with a cam path 24, said roller 23 being connected to a false bottom 25 of the carrier 9 for ejection of the biscuit (Figures 1 and 5).

Disc 1 may be called the transfer disc, in that it is here that the biscuits 19 are transferred from a hopper 18 to the carriers 9. Each biscuit is then conveyed in its carrier to the disc 2 where it is iced or creamed and thence to the disc 3 where another biscuit may be laid upon it in order to form a sandwich, after which it is ejected from the carrier as described above.

A plurality of biscuit hoppers 18 are detachably secured in a magazine 29, each hopper being open at the top and partially closed at the bottom by spring retainers 30 (Figure 3) which are caused automatically to move clear of the bottom of the hopper when the hopper is placed in position in the magazine. The hopper in use is located at B (Figure 2) and the biscuit assumes its position totally within the carrier at position C. A stationary reception plate 20 beneath disc 1 is located beneath the hopper at B and extends substantially up to, but not beneath the hopper at C. A plate 31 (Figures 1 and 2) is located above the disc 1 and extends beneath all hoppers except that located at B. Thus when the disc rotates in the direction indicated by the arrow R (Figure 2) as any perforation comes under the hopper at B, the lowermost biscuit falls first upon an inclined leading wall 29 of the perforation, then wholly into said perforation, when it is moved along the plate 20 by abutment with a vertical following wall 50 until plate 20 terminates when the biscuit falls into a carrier 9 which synchronizes with the perforation at this point.

The stationary plate 31 prevents the biscuits from falling into the transfer disc 1 unless the hopper is in the correct feeding position shown at B (Figure 2).

Each carrier 9, when about to receive a biscuit is lifted so as to be in close proximity with the disc 1, by means of roller 11 and cam path 12 and is lowered clear of the face of disc 1 after having received the biscuit.

The magazine 29 is freely rotatable about the spindle 4. Located on top of the biscuits in each hopper is a contact plate 32 (Figures 3 and 6) which falls as the biscuits are removed from the bottom.

When the last biscuit falls onto transfer disc 1, a projection 53 on the contact plate catches in a slot 33 in the disc 1 and the magazine 29 is rotated with the disc until the stationary plate 31 having a bevelled edge 54 lifts the contact plate clear of the disc causing the magazine to stop and bringing a full hopper, previously located at A, into position at B.

The chain 8 carries the biscuit and carrier to disc 2 which has perforations 21 which are usually smaller than the biscuit. Whilst these perforations are shown rectangular in the drawings, they may, of course, be in the shape of a flower or any other decoration according to the deposit of confectory material required.

Mounted above this disc 2 with an open end contacting with it is a hopper 22 containing material such as cream. The biscuit is lifted, by means of roller 11 and cam path 12, into contact with the disc just as the stencil opening passes under the hopper containing the material to be applied so that a charge of said material is delivered through the stencil plate or disc 2 onto the biscuit beneath.

Various methods may be employed for forcing the confectory material downward in the hopper in order to ensure that the stencils may be properly filled. The method shown in the drawings consists of a pair of rollers 34, 35 situated within the hopper 22 which are caused to revolve towards one another by means of gearing 36 and bevel wheels 37, 38.

A scraper 55 is provided on one side of disc 2 in order to clean said disc after a biscuit has been treated with the material and before a fresh biscuit is presented to the stencil opening.

If desired, a second scraper may be provided to operate on the other side of said disc. The scraper 55 is mounted so as to be rotatable about an axis 56, which is parallel with the plane of said disc, whilst it is also rotatable about another axis 57 perpendicular to said disc so as to be movable along the surface of said disc.

After the biscuit has passed the hopper containing the confectory material, it is lowered from disc 2 by means of the said roller 11 and cam path 12 and is conveyed to disc 3 where another biscuit is placed over the creamed one to form a sandwich. The mechanism employed in connection with disc 3 is similar to that of disc 1.

After the completed sandwich has passed clear of disc 3 it is ejected (see Figure 5) by means of roller 23 contacting with cam path 24 and lifting false bottom 25 so as to allow the sandwich 26 to slide down chute 27 to conveyor belt 28.

An alternative method of operating the biscuit carriers is shown in Figures 7 and 8.

A carrier bracket 39 is rigidly fixed to chain link 40; carrier stem 41 is slidable vertically through the bracket and cam path 42 lifts the carrier. A false bottom 43 is shown hinged at 44 and is operated by roller 45 contacting with a cam path not shown.

A further alternative method is shown (Figures 9 and 10) where two chains 46 and 47 are adapted for holding the carrier 48 whereby greater rigidity is maintained.

In the drawings, three discs 1, 2, 3, are provided and as a result of this the biscuit which is prepared is in the form of an ordinary sandwich. It is obvious however, that numerous modified arrangements may be adopted without departing from the scope of the invention in order to prepare biscuits of varying forms. For example, if it is desired to automatically apply confectory material to a biscuit in the form of a double sandwich, three transfer discs and two application discs are provided, the transfer discs and application discs being situated alternately around the conveyor. Further if it is desired to form a sandwich comprising two biscuits with two different kinds of confectory material between said biscuits, such as for example, a sandwich with a layer of jam surrounded by a layer of cream in the same plane between a pair of covering biscuits, then two transfer discs would be employed, one for the biscuit forming the base and one for the biscuit forming the top, with two application discs interposed between said transfer discs.

I declare that what I claim is:—

1. A machine for automatically applying material to biscuits including a rotatable rigid stencil plate having a plurality of stencil openings therethrough, means to convey biscuits one by one opposite a stencil opening in said plate, means for applying confectory material through said opening, and cleaning devices engaging with the sides of said plate adapted to clean this before a fresh biscuit is presented to the same stencil opening.

2. A machine for automatically applying confectory material to biscuits including a rigid stencil plate having a plurality of stencil openings therethrough, means to convey biscuits one by one to a position beneath said plate, means for rotating said stencil plate to bring the openings therethrough one at a time directly above the path of travel of the biscuits, means for applying confectory material through said openings on to said biscuits, and cleaning devices adapted to clean each opening after it has left its position at which confectory material has been passed therethrough.

3. A machine for automatically applying confectory material to biscuits including a stencil plate in the form of a flat rotatable disc having a plurality of stencil openings adjacent the periphery thereof, a hopper for containing confectory material, means to rotate said disc so that said stencil openings pass successively beneath said hopper and means to convey biscuits one by one beneath said openings as said openings pass beneath said hopper.

4. A machine for automatically applying confectory material to biscuits including a plurality of discs having perforations formed therein, conveyor means beneath said discs, a biscuit hopper above one of said discs, means for bringing the perforations in said disc successively beneath said biscuit hopper, means for transferring biscuits one by one through said perforations from the biscuit hopper to the conveyor means, a second hopper for containing confectory material above a second disc displaced from said first mentioned disc, means for bringing the perforations in said second disc successively beneath said second hopper and means for conveying biscuits one at a time into a position beneath said second hopper coincidentally with a perforation of said second disc.

5. A machine for automatically applying confectory material to biscuits comprising in combination a plurality of rotatable perforated discs including a transfer disc and an application disc, a plurality of interconnected carriers beneath said discs, means for moving said carriers in an endless path around the discs, a hopper for containing biscuits above said transfer disc, means for bringing the perforations in said disc successively beneath said hopper, means for transferring biscuits through said perforations from the hopper to the carriers, a hopper for containing confectory material above said application disc, means for bringing the perforations in said application disc successively beneath said hopper and means for conveying the biscuits in said carriers one by one beneath said hopper coincidentally with a perforation in said application disc.

6. A machine for automatically applying confectory material to biscuits including a rotatable perforated transfer disc, an open ended hopper for containing biscuits above said disc, a plurality of interconnected carriers beneath said disc, means for rotating said disc so that the perforations therein move successively beneath said hopper and a stationary reception plate located between said disc and said carriers whereby a biscuit, having fallen from the hopper is retained for a period of rotation of the disc within a perforation in the disc before being transferred to a carrier.

7. A machine for automatically applying confectory material to biscuits including a plurality of rotatable discs having perforations adjacent the periphery thereof, a plurality of toothed sprockets connected concentrically to each disc, a plurality of endless chains engaging with said sprockets, biscuit carriers supported by said chains and means for rotating said discs and sprockets so that the position of each carrier will coincide in turn with one of the perforations of each disc.

8. A machine for automatically applying confectory material to biscuits including a plurality of rotatable discs having perforations adjacent the periphery thereof, a pair of toothed sprockets connected concentrically to each disc, a pair of endless chains engaging with said sprockets, biscuit carriers supported by said chains and means for rotating said discs and sprockets so that the position of each carrier will coincide in turn with one of the perforations of each disc.

9. A machine for automatically applying confectory material to biscuits including a plurality of rotatable discs having perforations adjacent the periphery thereof, an endless series of chain supported biscuit carriers beneath said discs, means for rotating said discs and for moving said carriers so that the position of each carrier will coincide in turn with one of the perforations of each disc and means for moving each carrier individually on a plane perpendicular to the common direction of motion of the carriers at points adjacent its position of coincidence with a perforation of a disc.

10. A machine for automatically applying confectory material to biscuits including a plurality of rotatable discs having perforations adjacent the periphery thereof, an endless series of chain supported biscuit carriers beneath said discs, means for rotating said discs and for moving said carriers so that the position of each carrier will coincide in turn with one of the perforations of each disc a cam face following the path of said carriers and rollers connected with said carriers engaging with said cam face for moving any carrier into and out of close proximity with a disc before and after said carrier moves into coincidence with a perforation in said disc.

11. A machine for automatically applying confectory material to biscuits including a rigid rotatable transfer disc having perforations adjacent the periphery thereof the said perforations being bounded by sides, one side of which is normal to the surface of the disc whilst the other side is inclined thereto.

12. A machine for automatically applying confectory material to biscuits including a transfer disc having a plurality of perforations adjacent the periphery thereof, an application disc also having a plurality of perforations adjacent the periphery thereof, a hopper for containing biscuits above said transfer disc, a hopper for containing confectory material above said application disc, means common to both of said discs for rotating same so that the perforations in said transfer disc are brought successively beneath said biscuit hopper and the perforations in said application disc are brought successively beneath said hopper for containing confectory material and horizontally disposed means for conveying the biscuits from beneath said transfer disc to beneath said application disc.

13. A machine for automatically applying confectory material to biscuits including a transfer disc having a plurality of perforations adjacent the periphery thereof, an application disc also having a plurality of perforations adjacent the periphery thereof, a hopper for containing biscuits above said transfer disc, a hopper for containing confectory material above said application disc, means common to both of said discs for rotating same so that the perforations in said transfer disc are brought successively beneath said biscuit hopper and the perforations in said application disc are brought successively beneath said hopper for containing confectory material, an endless conveyor for said biscuits and means to guide said conveyor throughout its movement in a substantially horizontal plane.

14. A machine for automatically applying confectory material to biscuits including a plurality of rotatable rigid discs having perforations adjacent the periphery thereof, hoppers for containing biscuits above at least one of said discs, hoppers for containing confectory material above at least one other of said discs, means common to all of said discs for rotating same so as to bring the perforations in each of said discs successively beneath the corresponding hopper and horizontally disposed conveyor means for transporting said biscuits successively beneath said discs.

15. A machine for automatically applying confectory material to biscuits including a plurality of rotatable rigid discs having perforations adjacent the periphery thereof, hoppers for containing biscuits above at least one of said discs, hoppers for containing confectory material above at least one other of said discs, means common to all of said discs for rotating same so as to bring the perforations in each of said discs successively beneath the corresponding hopper, an endless conveyor for said biscuits and means to guide said conveyor throughout its movement in a substantially horizontal plane.

16. A machine for automatically applying confectory material to biscuits including a plurality of rotatable discs having perforations adjacent the periphery thereof, an endless series of chain supported carriers beneath said discs, means for supplying biscuits through the perforations of one of said discs to said carriers, means for applying confectory material through the perforations of a second rotatable disc to said biscuits on said carriers and means for ejecting said biscuits from said carriers.

17. A machine for automatically applying confectory material to biscuits including a plurality of rotatable discs having perforations adjacent the periphery thereof, an endless series of chain supported carriers beneath said discs, means for supplying biscuits through the perforations of one of said discs to said carriers, a cam surface following the path of said carriers and rollers each connected with a carrier co-operating with said cam path to cause displacement of said carriers for ejection of the biscuits.

18. A machine for automatically applying confectory material to biscuits including a plurality of rotatable discs having perforations adjacent the periphery thereof, an endless series of chain supported carrier brackets beneath said discs, carriers mounted on said brackets, two cam faces following the path of said carriers, a false bottom in each carrier, a roller associated with each carrier and co-operating with one of said cam faces for movement of said carrier in a plane perpendicular to the direction of motion of said carriers, a second roller also associated with each carrier and co-operating with the other cam face for displacement of said false bottom relative to the carrier for ejection of a biscuit and means for supplying biscuits through the perforations of one of said rotatable discs on to said carriers.

19. A machine for automatically applying confectory material to biscuits including a rigid rotatable disc having a plurality of perforations adjacent the periphery thereof, a magazine rotatably mounted above said disc, a plurality of biscuit hoppers secured in said magazine, means for automatically revolving said magazine to bring a full hopper at any instant into the correct position for delivering biscuits to said disc in place of a hopper just emptied and conveyor means displaceable beneath the perforations in said disc for receiving said biscuits from said disc.

20. A machine for automatically applying confectory material to biscuits including a transfer disc, a magazine above said transfer disc, a plurality of open bottomed biscuit hoppers detachably secured in said magazine and spring operated catches on each of said hoppers adapted to retain the biscuits in position in a hopper when the hopper is detached from the magazine and adapted to be automatically opened to allow the biscuits to fall through when the hopper is fixed in the magazine.

In witness whereof, I have hereunto signed my name this 4th day of August, 1928.

EDWARD MILNER CROSLAND.